Aug. 31, 1937.  J. R. EMERSON  2,091,436
CARBURETOR
Filed Aug. 30, 1933  9 Sheets-Sheet 4

Fig.6.

Inventor
J. R. EMERSON

Aug. 31, 1937.   J. R. EMERSON   2,091,436
CARBURETOR
Filed Aug. 30, 1933   9 Sheets-Sheet 5

Inventor
J. R. EMERSON

Aug. 31, 1937.　　　J. R. EMERSON　　　2,091,436
CARBURETOR
Filed Aug. 30, 1933　　　9 Sheets-Sheet 6

Patented Aug. 31, 1937

2,091,436

UNITED STATES PATENT OFFICE 2,091,436

CARBURETOR

John Russell Emerson, Flint, Mich., assignor, by mesne assignments, to Borg-Warner Corporation, Chicago, Ill., a corporation of Illinois Application August 30, 1933, Serial No. 687,495

13 Claims. (Cl. 261—41)

This invention relates to certain new and useful improvements in carburetors of the plain tube down draft type and is an improvement on the construction of carburetor disclosed in my application for carburetors filed February 3, 1931, Serial Number 513,185, which is now Patent No. 2,050,995, dated Aug. 11, 1936, the object being to improve the general construction of carburetor whereby it can be manufactured cheaply, the same being formed of two sections detachably connected together.

Other and further objects and advantages of the invention will be hereinafter set forth and the novel features thereof defined by the appended claims.

In the drawings,

Figure 7ª is a detail perspective view of the deflector detached;

Figure 7ᵇ is a detail vertical enlarged section of the lower portion of the emulsion tube showing the deflector in position;

Figures 1, 2, 18, 21:
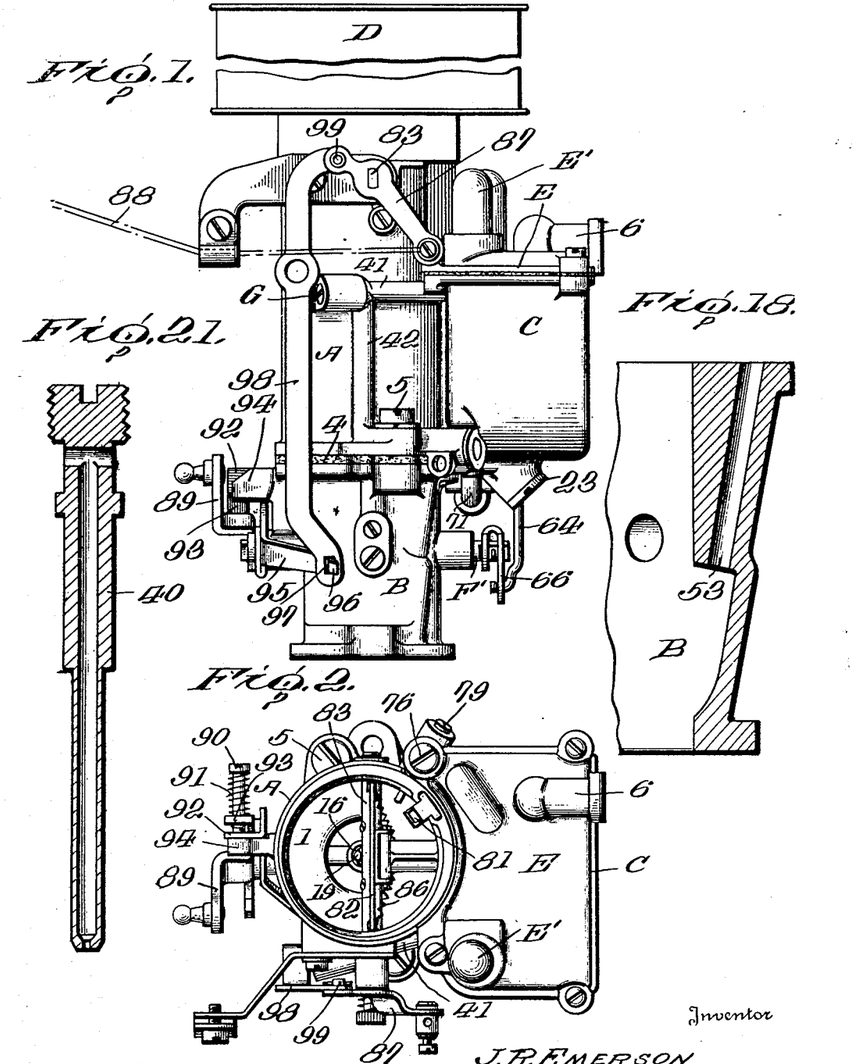
Figure 1 is a side elevation of a carburetor constructed in accordance with my invention showing an air cleaner connected thereto.
Figure 2 is a top plan view with the air cleaner removed.
Figure 18 is a detail section through a portion of the mixing chamber.
Figure 21 is an enlarged section through the idling jet.
Figures 3, 4, 20:
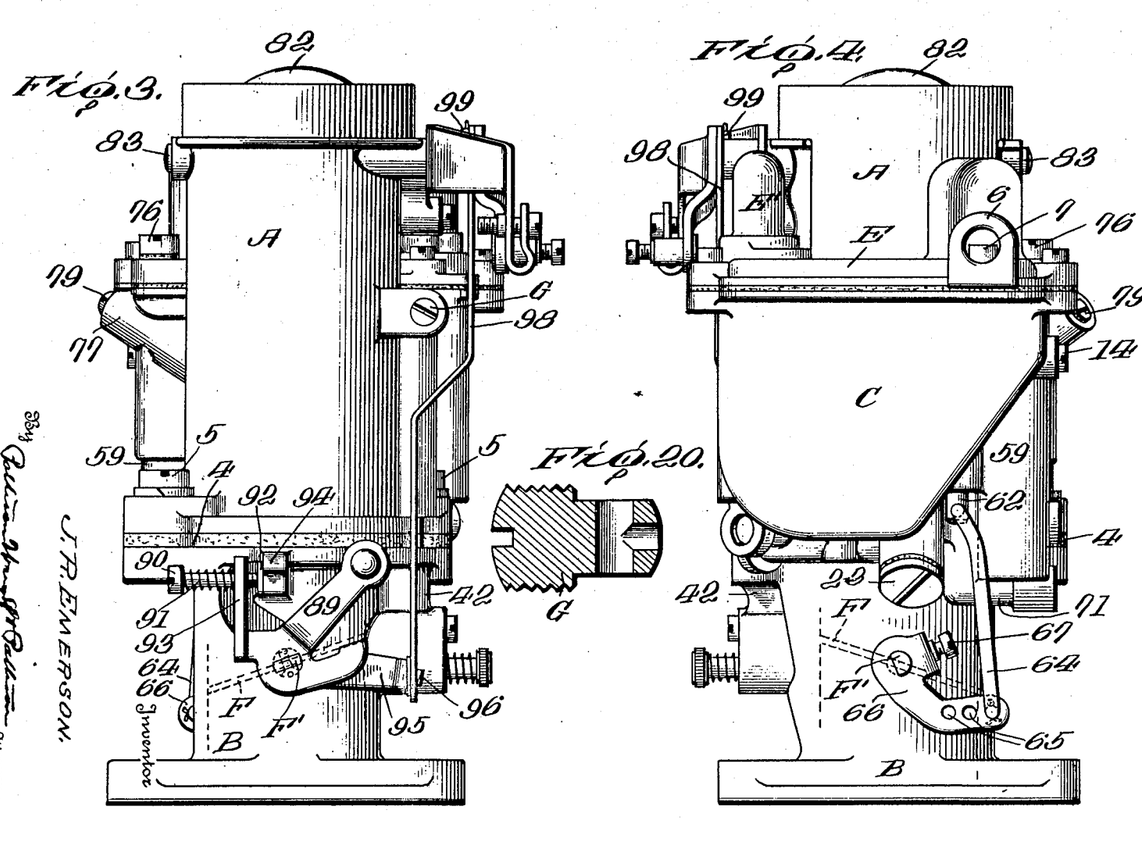
Figure 3 is a side elevation taken at right angles to that disclosed in Figure 1.
Figure 4 is a side elevation taken from the opposite side to that disclosed in Figure 3.
Figure 20 is an enlarged section through the air jet.
Figures 5, 19:
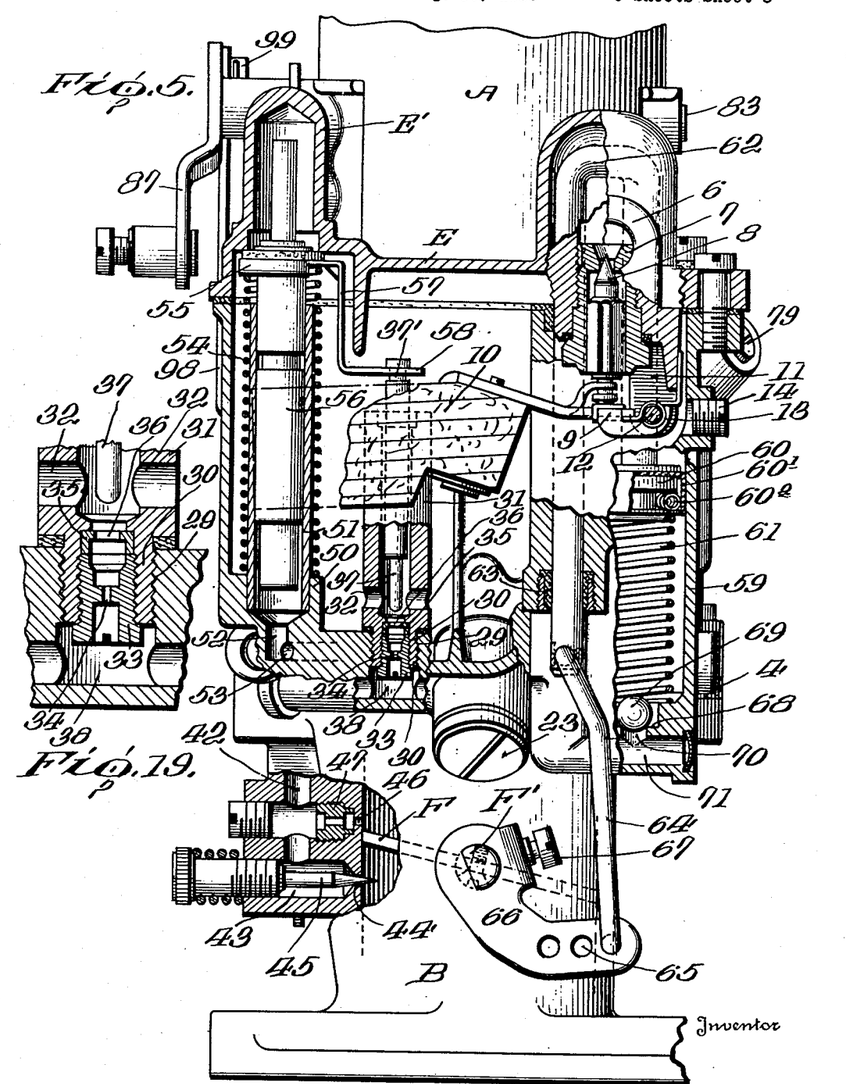
Figure 5 is a side elevation, partly in section.
Figure 19 is an enlarged vertical section through a portion of the metering pin housing showing the metering pin within the metering pin jet.

In the commercial embodiment of my invention as herein shown, the body of the carburetor is formed of an upper section A and a lower section B, the upper section having formed integral therewith a float chamber C. The upper section which is formed of a casting is provided with a carbureting passage 1 having an air inlet at its upper end over which is arranged an air cleaner D as shown in Figure 1. The lower end of the casting forming the upper section has formed integral therewith a Venturi tube 2 which extends into the lower section B which forms a mixing chamber 3. The upper and lower sections are provided with flanges between which is arranged a gasket 4, said sections being secured together by bolts 5 which allows the sections to be readily assembled or taken apart.

While I have shown in the drawings a particular manner of forming the body of two sections it is, of course, understood that various changes can be made without departing from the spirit of my invention.

The float bowl C is provided with a detachable cover E having a fuel inlet 6 provided with a detachable valve seat 7 on which is adapted to be seated a valve 8 carried by an arm 9 of a float 10, said arm being pivotally mounted in a bracket 11 on a pivot pin 12 which is surrounded by a coil spring 13, one end of which engages the bracket, the other the float arm in order to prevent the float from bobbing. The float bowl is provided with an inspection opening closed by a plug 14 for checking the fuel level within the bowl. The float bowl is also provided with a partition 15 which has the tendency to prevent the fuel within the float chamber from surging back and forth and is of particular advantage when used in connection with a flexibly mounted motor.

The section A having the carbureting passage is provided with a centrally arranged emulsion tube 16 carried by a web 17 extending from one wall of the carbureting passage, which web is provided with a bore 18 having an enlarged lower end forming a fuel passage 18' and into which is extended a nozzle 19 which is provided with a collar 20 at its lower end forming a shoulder which is held in contact with a shoulder 21 by a coil spring 22 held in position by a plug 23. The upper end of the nozzle 19 is provided with a jet opening 24 arranged within the emulsion tube 16 and through which fuel is adapted to be drawn from the float bowl as will be hereinafter fully described. As the fuel is delivered into the emulsion tube, an emulsion of fuel and air is formed which is delivered into the Venturi tube 2.

Figures 7, 7A, 7B:
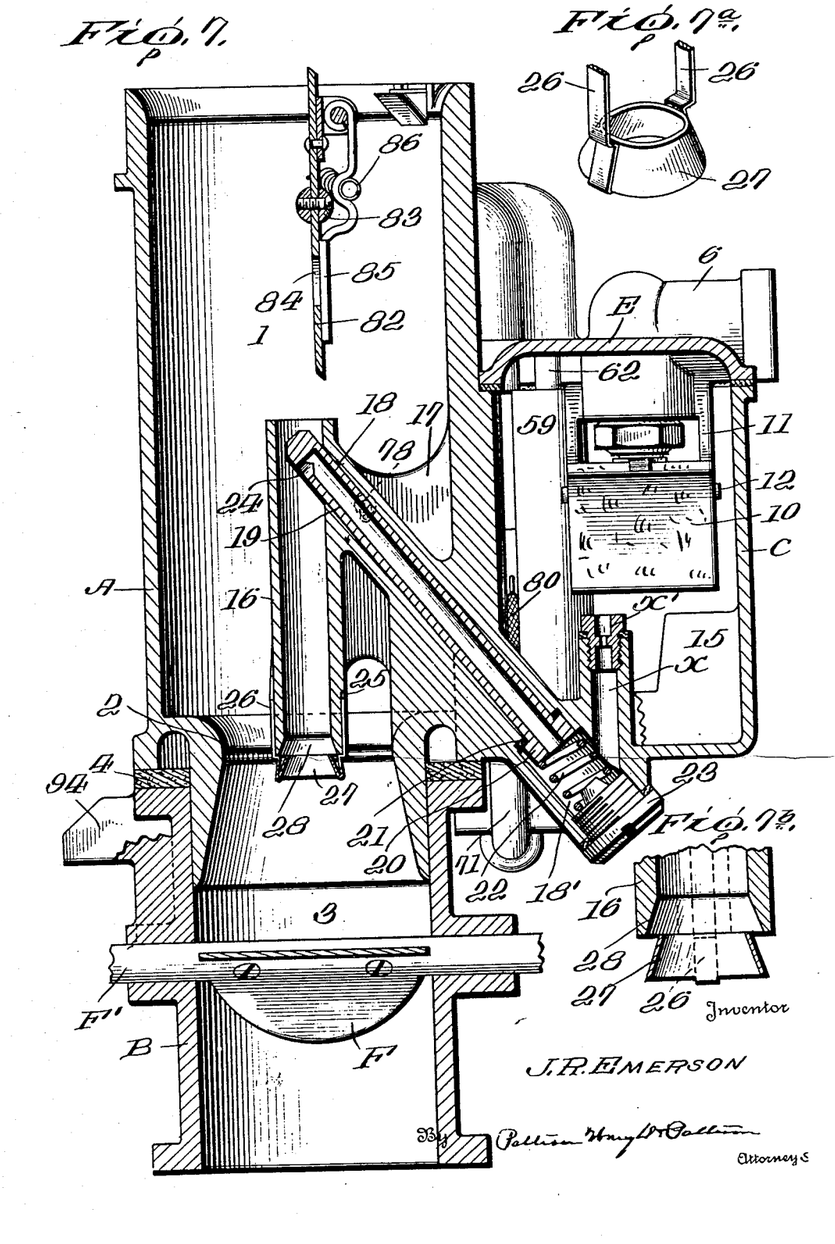
Figure 7 is a vertical section.
Figure 8:
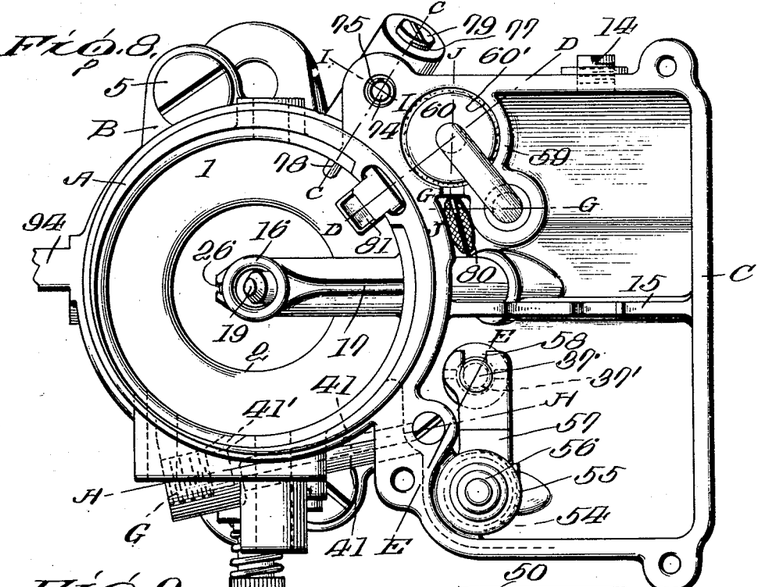
Figure 8 is an enlarged top plan view with the top of the float bowl removed.
Figure 9:
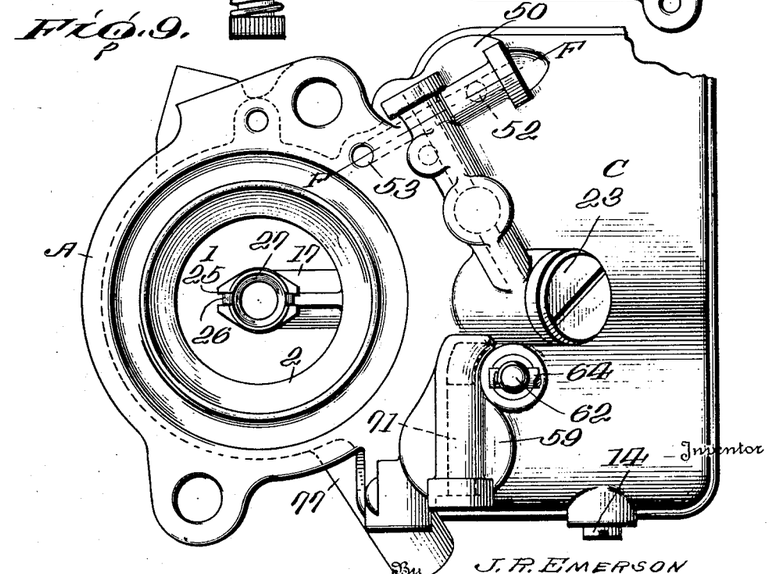
Figure 9 is an inverted plan view with the mixing chamber section removed.

The emulsion tube 16 is provided with guideways 25 in which are secured the arms 26 of a deflector 27 substantially of frusto conical shape which is disposed below the conical end 28 of the emulsion tube as clearly shown in Figures 7 and 7$^b$ whereby the emulsion of fuel and air produced in the emulsion tube will be delivered into the Venturi tube in order to form a preliminary mixture, whereby the air passing through the Venturi tube will pick up this rich emulsion and an explosive mixture will be produced in the mixing chamber 3.

The bottom of the fuel bowl C is provided with an internally threaded nipple 29 into which is threaded a neck 30 of a metering pin housing 31 provided with oppositely disposed inlets 32 in communication with the fuel bowl and through which fuel is adapted to pass into the interior of the housing 31. The neck 30 is internally threaded and carries a threaded plug 33 which is provided with a calibrated power jet 34 which secures in position an inverted brass cap 35 which is provided with a metering pin jet 36 through which a metering pin 37 is adapted to extend so as to control the flow of fuel from the float bowl into a fuel passage 38 which communicates with the fuel passage 18′ at the lower end of the nozzle 19 and through which fuel passes. The fuel passage 38 communicates with a well 39 in which is disposed an idling jet 40 detachably mounted therein by having its upper end threaded as clearly shown in Figure 6, said idling jet being in communication with an idling passage 41 formed in the section A which registers with an idling passage 42 formed in the section B. The idling passage 42 terminates in a chamber 43 which is in communication with the passage of the section B to the engine side of a throttle valve F, said communications being through a valve controlled opening 44 through which extends a needle valve 45 for controlling the supply of idling mixture to the carbureting passage to the engine side of the throttle. The idling passage 42 is in communication with the mixing chamber anterior of the throttle through an opening 46, a suitable calibrated plug 47 being arranged therein. This provides means for supplying fuel for idling through openings 44 and 46 and the operation of which will be hereinafter fully described.

Air is supplied to the idling by pass system from the carbureting passage 1 through passage 41′ and idling air vent G which is threaded into a bore 41$^2$ in communication with the passage 41.

In order to provide means for controlling the position of the metering pin by the vacuum existing in the carbureting passage to the engine side of the throttle valve, I provide the float bowl with a boss 50 in which is arranged a cylinder 51, said boss having a passage 52 which registers with a passage 53 in communication with the carbureting passage to the engine side of the throttle valve as clearly shown in Figure 1. The cylinder 51 is surrounded by a coil spring 54 which engages a collar 55 carried by a piston 56 mounted within the cylinder 51, said collar being provided with an arm 57 which is bifurcated as shown at 58 and is adapted to receive the grooved portion 37′ of the metering pin 37 so that as the piston is moved down by the vacuum existing in the carbureting passage, the metering pin will be moved down so as to meter the supply of fuel as will be hereinafter fully described.

The upper end of the piston extends into a housing E′ formed in the cover of the fuel bowl.

Figure 6:
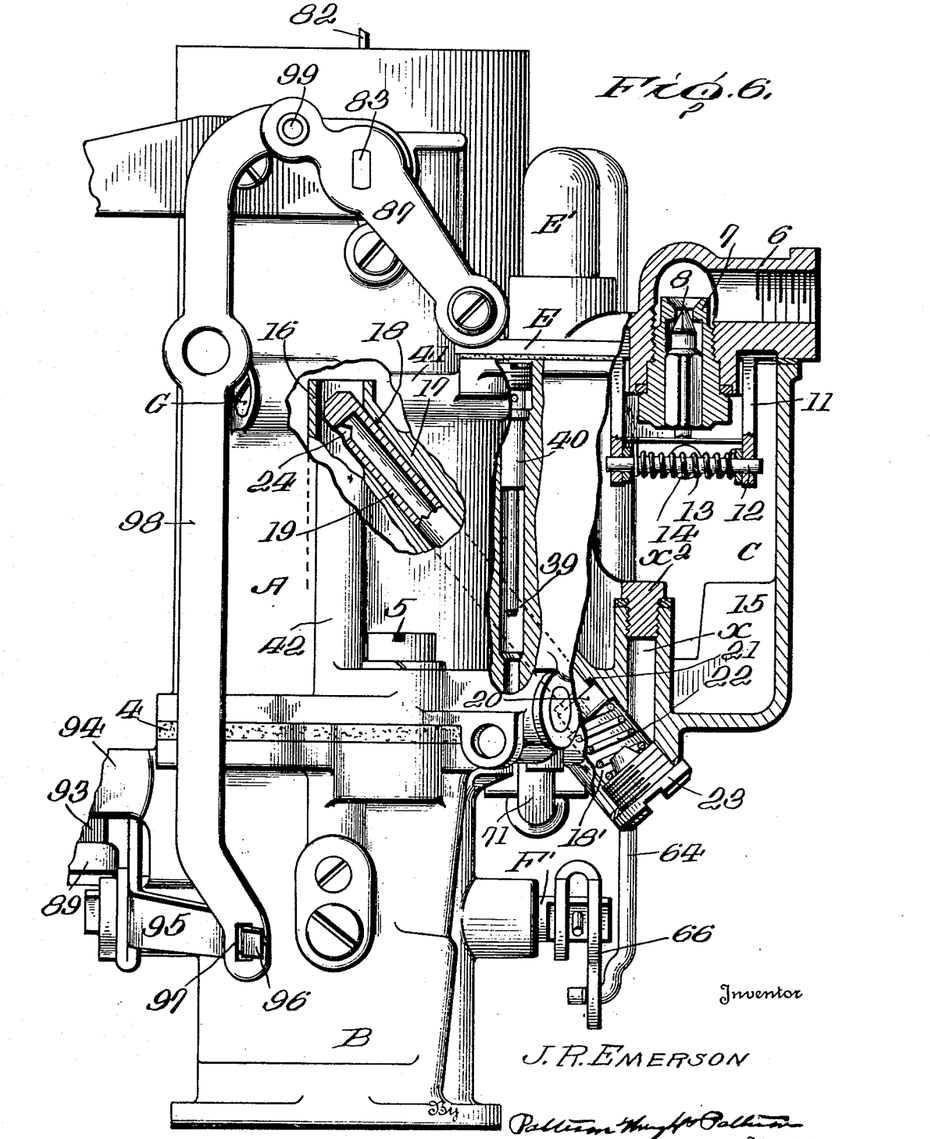
Figure 6 is a side elevation, partly in section, showing the idling jet and float mounting.

In the ordinary construction of carburetor, all the fuel passing to the main nozzle and idling jet is metered, but in some instances where the carburetor is to be used in connection with exceedingly large engines, an auxiliary supply passage X is provided which is in communication with the fuel bowl through a calibrated plug X′, which plug can be removed and a solid plug inserted as shown at X$^2$ in Figure 6.

In the ordinary operation of the carburetor, the plug X$^2$ is in position so as to close the auxiliary fuel passage X and the calibrated plug X′ is only used under unusual circumstances where it is desired to supply an excess amount of fuel.

In order to provide means for supplying fuel for acceleration, I provide the fuel bowl with a pump cylinder 59 in which is mounted a piston 60 normally held in raised position by a coil spring 61, said piston being carried by an inverted U-shaped piston rod 62, the free end of which extends through a packing 63 and has connected thereto a link 64, the free end of which is adjustably mounted in one of the openings 65 of an arm 66 secured on the shaft F′ of the throttle valve F by a screw 67.

This provides an adjustable connection between the piston rod and the arm of a throttle valve. The pump cylinder 59 is provided with a valve seat 68 in its bottom on which is seated a ball valve 69 for closing an inlet 70 which is in communication with a passage 71 forming a fuel inlet which communicates with the bowl as clearly shown in Figure 17 so as to allow fuel to be drawn into the pump cylinder when the piston is raised. The pump cylinder communicates with an outlet passage 72 provided with a check valve 73 engaged by a plunger 74 surrounded by a spring 75 which is engaged by a screw plug 76.

The piston 60 consists of a flexible leather cup 60′ held against the walls of the pump cylinder by an expanding spring 60$^2$ to form a fuel tight piston.

The fuel passage 72 communicates with a diagonally arranged passage 77 in which is arranged a detachable nozzle 78 extending into the carbureting passage as clearly shown. The passage 77 is closed by a plug 79. This provides means for injecting fuel into the carbureting passage as the throttle valve is moved into open position. The inlet passage 71 is in communication with the float bowl through a strainer 80 as shown in Figure 7.

Figure 11:
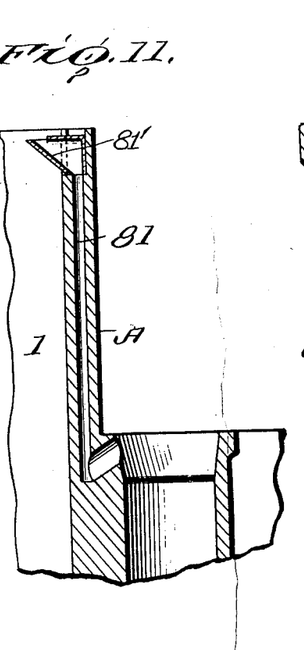
Figure 11 is a section on line d—d of Figure 8.
Figure 12:
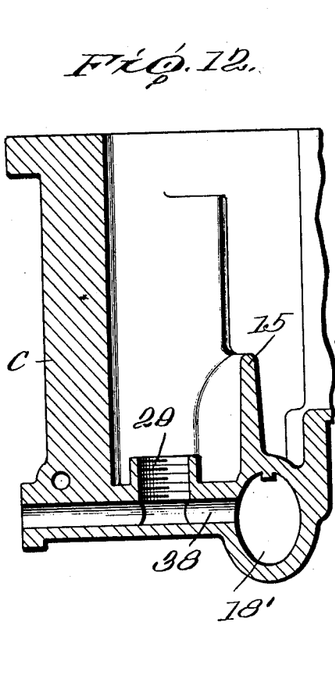
Figure 12 is a section on line e—e of Figure 8.
Figure 13:
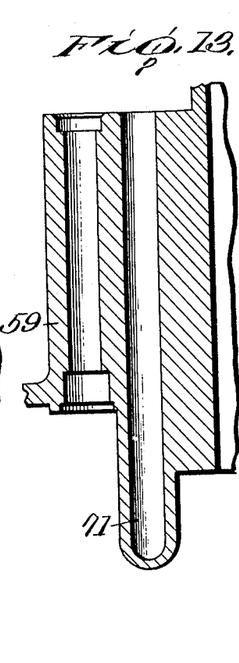
Figure 13 is a section on line g—g of Figure 8.
Figures 14, 15, 16, 22:
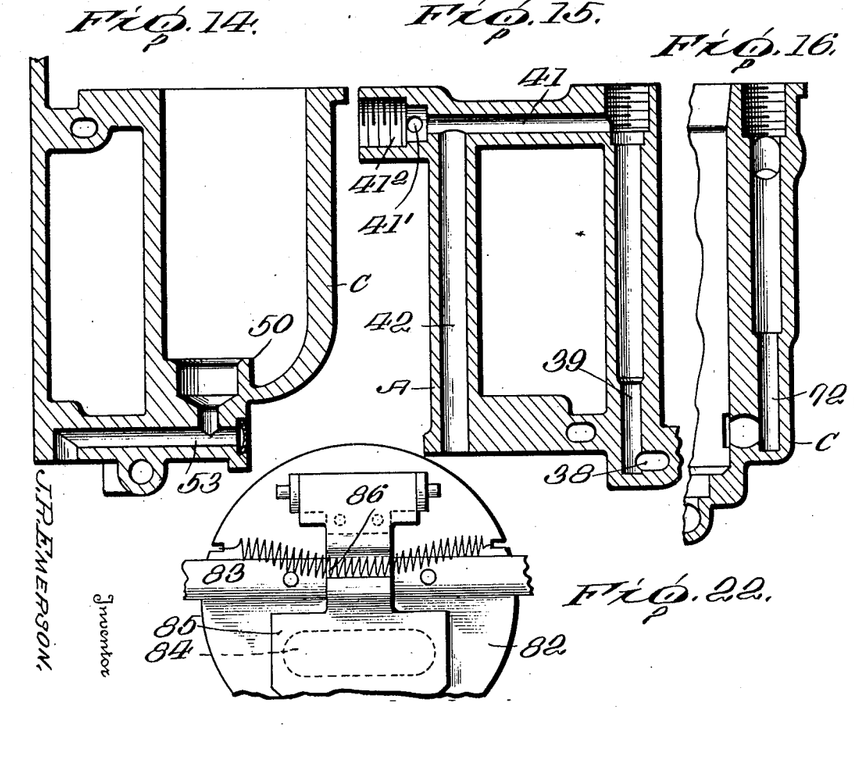
Figure 14 is a section on line f—f of Figure 9.
Figure 15 is a section on line h—h of Figure 8.
Figure 16 is a section on line i—i of Figure 8.
Figure 22 is a detail plan view of the choke valve.

The float chamber is in communication with an air passage 81 as shown in Figure 11 leading to the carbureting passage 1 so as to produce subatmospheric pressure within the fuel bowl to retard the flow of fuel therefrom as will be hereinafter fully described. At the end communicating with the carbureting passage, the passage 81 terminates in a lip 81′ projecting into the inlet of the carbureting passage and opening counter to the direction of air flow therethrough.

Figure 17:
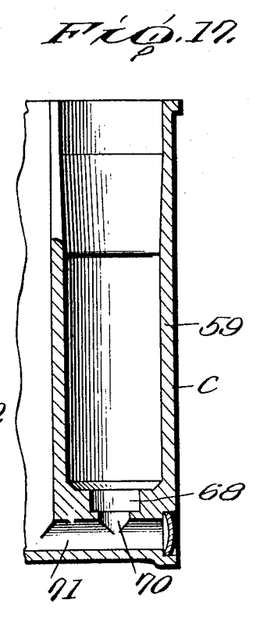
Figure 17 is a section taken on line j—j of Figure 8.
Figure 23:
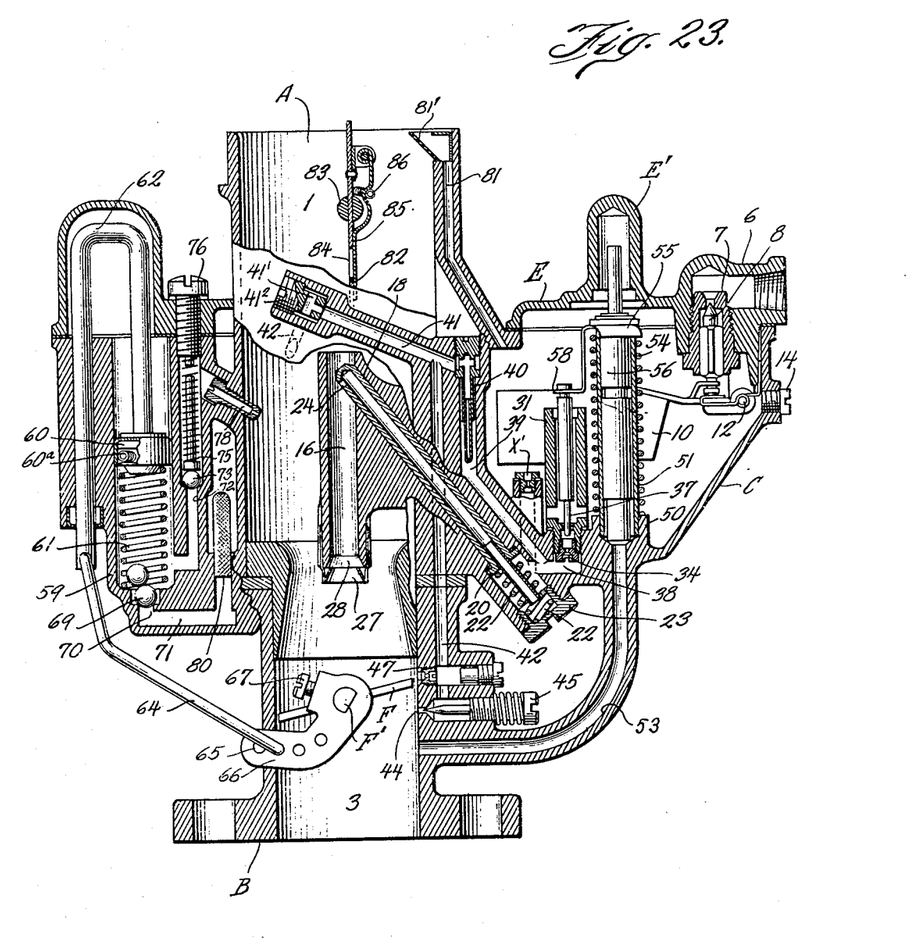
Figure 23 is a diagrammatic view showing the conduits and passages of the carburetor in one view.

The air passage 81 is in communication with the top of the fuel pump cylinder, the wall of the cylinder being cut away as clearly shown in Figure 17, this being for convenience in forming communication between the bowl and air inlet of the carburetor.

The air inlet of the carburetor is provided with a choke valve 82 carried by a shaft 83, said choke valve being provided with an opening 84 closed by a pivoted valve 85 held in its closed position by a spring 86 forming a compensating valve in order to allow the valve 85 to open by suction and supply the proper amount of air to form the mixture without overenriching the mixture when the choke is in closed position. The choke valve shaft 83 carries an arm 87 to which is adapted to be connected a choke operating wire rod 88 for operating the choke valve.

In order to provide means for automatically opening the throttle valve for starting the engine to which the charge forming device is connected, I provide the throttle valve shaft F' with an operating arm 89 to which the ordinary accelerator and throttle control are adapted to be connected, said arm being fixed on the throttle valve shaft F' and is provided with a stop screw 90 held in its adjusted position by a coil spring 91, said stop screw being adapted to engage a lug 92 carried by an arm 93 which is pivotally mounted on the throttle valve shaft and moves independent of the arm 89, said lug being adapted to be normally held in engagement with a stop lug 94 formed integral with the section B. The arm 93 is provided with an auxiliary arm 95 which is reduced as shown at 96, adapted to extend in an opening 97 of a connecting link 98 which is pivotally connected to the arm 87 as shown at 99 whereby when the choke valve is moved into closed position by the dash control, the throttle valve will be moved into slightly open position to facilitate the starting of the engine.

The operation of the various features of the carburetor constructed in accordance with my invention as herein shown and described is as follows:

*Main nozzle and idle by pass system*

In the construction shown, with the exception of the fuel discharged by the accelerating pump, all fuel entering the mixing chamber must pass through the metering pin housing and assembly where it is led through suitable channels to the main nozzle and the idling jet. The fuel discharged from the main nozzle is mixed with air entering the upper end of the emulsion tube and is discharged from the lower end in the form of a rich emulsion into the Venturi tube where it is still further mixed with air before it enters the mixing chamber to produce the proper mixture.

The main nozzle is held in place against the nozzle gasket by a nozzle retaining plug and nozzle retaining spring which allows this nozzle to be readily inserted or removed. On full throttle, all the fuel enters the engine through the main nozzle. However, under light loads, part throttle, some fuel is fed through the idling jet into the by pass channel and enters the mixing chamber through the idling control and idling adjustment openings 44 and 46. Air is supplied to the idling by pass system from the carburetor air inlet through the idling air vent jet G. From this point downwardly, the idling charge is a rich air and fuel emulsion.

With the engine idling under no load, all the fuel supplied to the mixing chamber and the engine passes through the idling by pass system and on the average automobile, the main nozzle does not feed fuel below 15 miles per hour with the car running at an even speed on a level road which is the equivalent of about 800 revolutions per minute, road load for the engine. Of course, under acceleration or in climbing a grade, the main nozzle 24 feeds instantaneously as the throttle valve is opened further allowing more air to pass through the venturi 2 thus increasing the suction on the nozzle.

When a carburetor constructed in accordance with the invention as herein shown is used on the ordinary type of engine, all the fuel is supplied through the metering opening, but when used in connection with exceedingly large engines or specially constructed engines, the plug $X^2$ is removed and the calibrated plug X' is substituted therefor so that a part of the fuel is fed directly from the fuel bowl to the main nozzle without passing through the metering assembly whereby a sufficient amount of fuel will be supplied to the auxiliary passage X so as to meet the requirements of the engine.

*Metering pin, power jet and vacuum step-up*

In the construction as herein shown, the metering pin housing assembly is composed of a metering pin and metering pin housing in which is pressed a sheet brass cup to form a metering pin jet 36 and the power jet 34 is threaded into the lower end of the metering pin housing. The metering pin 37 is in the uppermost position on full throttle with the pin out of the metering pin jet as clearly shown in the drawings and the opening or orifice in the metering pin jet 36 is much larger than the orifice in the power jet 34 and therefore has no calibrating effect on the full throttle mixture. The full throttle or power mixture of the carburetor is controlled by the power jet 34.

The air passage 53 extends from the vacuum step-up sleeve or cylinder to a point below the throttle valve so as to bring into communication the vacuum cylinder with the intake of the engine to the engine side of the throttle valve and as the vacuum produced has the tendency to draw the piston downwardly against the vacuum step-up spring 54, the metering pin 37 moves therewith. When the throttle is closed sufficiently to raise the suction below the throttle valve to a point where the suction will overcome the pressure of the spring acting on the piston of the vacuum chamber, the vacuum step-up piston and attached metering pin lifter arm are drawn downwardly into the lower end until the piston seats in the bottom of the chamber. This lowers the metering pin into the metering pin jet 36, thus diminishing the fuel supplied to the main nozzle and idling system to obtain part throttle economy due to the fact that the area of the annulus between the metering pin and metering pin jet is less than the area of the power jet orifice.

When the speed of the engine exceeds approximately 15 miles per hour, the main nozzle commences to feed at this speed and as the throttle is opened, the suction on the main nozzle 24 increases causing an increased discharge from the nozzle 24 and a decrease in idling discharge, since both the idling system and the main nozzle are joined by a passage 38, until at about 30 miles per hour the main nozzle is feeding a greater portion of the fuel to the mixing chamber. Due to the small fuel orifice in idling jet, a change in size of the metering pin jet has little effect on the idling system. However, due to the comparatively free passage in the main nozzle, a change of metering pin jet size does affect the quantity of fuel discharged from the nozzle, therefore a change in metering pin jet size is more effective above 30 miles per hour, part throttle.

I have found in practice that the main nozzle 19 need rarely be changed as the size of the nozzle outlet jet 24 and nozzle bore only affects the size of the power jet required and does not affect the shape of the mixture curve. The size of the outlet and bore of the nozzle are chosen for any given size of carburetor to allow the use of a convenient size power jet, for example, if the outlet and bore are too small, the power jet will need to be so large that a special metering pin housing will be required, and if the outlet and bore are too large, the power jet will need to be so small that a slight change in size will affect the part throttle or metering pin calibration.

The vacuum step-up spring 54 is generally calibrated to allow the lean part throttle economy range to extend to speeds of from 60 to 70 miles per hour on a level road. To accomplish this the vacuum step-up must function anywhere from 4 to 7 inches of mercury manifold depression, depending upon the engine, and this would be roughly from 2 to 3 and one-half pounds per square inch of manifold depression or suction. However, if the sole purpose of the step-up was to cause a transfer from economy to power mixture at high speed or when the throttle is open more than 75%, it would have no advantage over a metering pin or economizer mechanically controlled to operate at ¾ throttle position. The manifold vacuum however, is not only dependent upon engine speed and throttle opening, but also upon the load and it is possible to have full load and low manifold suction at low speed with ¼ throttle open. Under this condition, the step-up would form a full power mixture and would obviate the necessity of the main nozzle trying to function under low suction with a restricted metering and this construction removes what is known in plain tube carburetors as fading as the step-up also functions on any acceleration which imposes a load on the engine and consequently a drop in manifold depression even though only momentarily, thus aiding the accelerating pump and removing the lean feeding.

The step-up is advantageous whenever the manifold suction is low on part throttle so as to aid in cold starting and warm-up.

The idling system above described is composed of the idling fuel jet 40, idling air vent jet G, idling control hole 46, and idling adjustment hole 44. In series with the idling control hole 46 is idling control jet 47. The idling adjusting needle 45 controls the quantity of the rich emulsion supplied by the idling by pass channel 42 delivered to the mixing chamber 3. The throttle valve adjusting screw 90 controls the position of the throttle valve F herein illustrated in closed position and therefore controls the quantity of pure air (since main nozzle 19 is not feeding) supplied to the mixing chamber 3 for idling the engine. The rich emulsion from 44 mixes with air passing throttle valve F to form the idling explosive charge for the engine. The quantity or volume of the rich emulsion passing adjusting needle 45 is small compared to the volume of air passing the throttle valve F, therefore the speed of the idling engine is controlled to the greatest extent by the throttle adjusting screw 90 and the quantity of the idling mixture entering the manifold is controlled by adjusting the needle valve 45, although 45 controls the quantity of rich emulsion entering the mixing chamber 3.

The location of the idling control hole 46 with respect to the upper edge of the throttle F is very important in controlling the off idling mixture and the period known as the idling transfer where the feeding of the idling system gradually decreases and the main nozzle feed gradually increases. The main nozzle starts to feed at approximately 15 miles per hour on a level road, although it may start as low as 10 miles per hour on a large engine, and in discussing the operation of the idling system, what I have termed as off idle will be considered from curb idle which is the lowest idle speed allowed by the throttle adjusting screw 90 to the point where the nozzle starts to feed and the idle transfer is extended from this point to 30 or 35 miles per hour at which speed the nozzle is feeding the greater portion of the fuel so that a smooth transfer is obtained from the idling system to the main fuel supply system of a charge forming device constructed in accordance with my invention.

*Accelerating pump*

The use of an accelerating pump in a down draft carburetor has been found essential due to the fact that down draft manifolds run much drier part throttle than up draft manifolds and even a slight acceleration requires additional wetting of the manifold and as the accelerating pump herein shown and described is connected to the throttle valve, it is operated by the movement thereof. The accelerating pump operates entirely independent of the metering system and discharges fuel downward from the nozzle upon any slight throttle opening.

When the throttle is closed, the plunger of the pump is moved upwardly and fuel is drawn from the fuel bowl or reservoir through the strainer past the pump inlet valve into the pump cylinder. When the throttle opens, the plunger 60 moves downward and the ball valve is seated by gravity and fuel pressure within the pump cylinder so that fuel will not leak back into the fuel bowl. The fuel pressure in the pump cylinder caused by the downward motion of the piston lifts the pump discharge valve, allowing fuel to be forced through the discharge nozzle 78. The quantity of fuel discharged depends upon the length of the plunger stroke which in turn depends upon the length of the pump lever 43 and the hole in which it is connected to the arm of the throttle shaft and by having this adjustable connection the pump can be adjusted for various installations.

*Choke and throttle valve connection*

By constructing a choke and throttle valve as herein shown and described and connecting the same through the medium of links, the throttle valve is moved into slightly open position when the choke valve is moved into closed position so as to facilitate the starting of the engine to which the carburetor is attached and by having the auxiliary air inlet in the choke valve a compensating valve is provided which is opened by suction so as to prevent overenrichening of the mixture.

*Sealed bowl*

In the construction herein shown the float chamber or constant level reservoir is sealed and the vent passage is die cast in the body A of the carburetor extending from the bowl to the air inlet and connects with the air inlet through an impact tube. The connection herein shown is through the passage 81 which connects with the air inlet and with the upper end of the pump cylinder which in turn communicates with the fuel bowl through the slot formed in the upper wall thereof and as an air cleaner is used in connection with this charge forming device, the fuel within the fuel bowl is subjected to sub-atmospheric pressure due to the restriction of the air cleaner and in the construction shown I have used an impact tube to prevent over compensation (too high a back suction on the metering jets) for rarefied air entering the carbureting air inlets, this air being rarefied or in other words made lighter per unit of volume because of air cleaner restriction. This provides means for holding back the fuel in the fuel bowl so as to balance the pressure on the metering jet.

Figure 10:
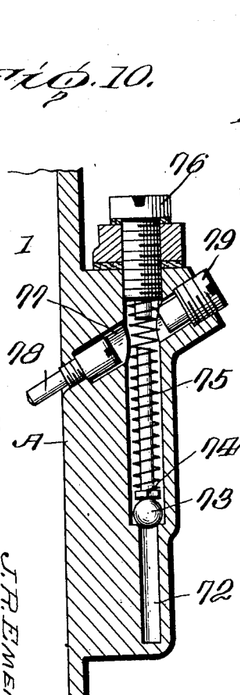
Figure 10 is a section on line c—c of Figure 8.

I have illustrated in Figure 10 a spring for holding the ball valve 73 on its seat, but it is, of course, understood that a weight could be substituted for the spring without departing from the spirit of my invention and while in the drawings and specification I have shown certain details of construction, it is, of course, understood that various changes can be made without departing from the spirit of my invention.

What I claim is:

1. A down draft carburetor having a carbureting passage provided with a throttle valve for controlling the outlet thereof, a float chamber, an emulsion tube disposed within said carbureting passage having open ends, a frusto conical spreader disposed below the discharge end of said emulsion tube, a nozzle extending into said emulsion tube, a fuel passage from said float chamber to said nozzle, a metering pin for said fuel passage, and vacuum actuated means for operating said metering pin.

2. A down draft carburetor having a carbureting passage provided with a throttle valve, a float chamber, an emulsion tube disposed within said carbureting passage having open ends, a frusto conical spreader disposed below the discharge end of said emulsion tube, a detachable nozzle extending into the upper end of said emulsion tube, a fuel passage extending from said float chamber to said nozzle and an idling passage extending from said fuel passage and terminating in said carbureting passage to the engine side of the throttle valve.

3. A down draft carburetor having a carbureting passage provided with a throttle valve controlling the outlet thereof, an emulsion tube disposed within said carbureting passage having open ends, a conical spreader disposed below the discharge end of said emulsion tube, a compensating choke valve arranged within the inlet of said carbureting passage, a float chamber having a metering pin controlled outlet, vacuum actuated means for controlling said metering pin and a nozzle extending from the outlet of said fuel float chamber and terminating in the inlet of said emulsion tube.

4. A down draft carburetor having a carbureting passage, an emulsion tube disposed within said carbureting passage having open ends, a float chamber having a metering pin controlled outlet, a fuel passage from said outlet to said emulsion tube, a fuel passage from said outlet to said carbureting passage and an impact tube extending from said float chamber and terminating in the inlet of said carbureting passage in a projecting lip anterior to the point of discharge of said emulsion tube and opening counter to the direction of air flow.

5. A down draft carburetor provided with a carbureting passage having an emulsion tube disposed therein, a float chamber provided with a metering pin controlled outlet, a fuel passage extending from said outlet, a detachable nozzle extending from said fuel passage to said emulsion tube, an idling passage extending from said fuel passage and terminating in said carbureting passage to each side of the throttle valve, means for actuating the metering pin by the vacuum existing in said carbureting passage to the engine side of the throttle valve and a pump actuated by the movement of the throttle valve for injecting fuel centrally into said carbureting passage against said emulsion tube.

6. A down draft carburetor having a carbureting passage provided with an emulsion tube in which is adapted to be formed an emulsion of fuel and air, a conical spreader disposed below the delivery end of said emulsion tube, a float chamber, a throttle valve controlling the outlet of said carbureting passage, a choke valve controlling the inlet of said carbureting passage, a sealed float chamber, an impact tube extending from said float chamber and terminating in the inlet of said carbureting passage, a connection between said choke valve and throttle valve whereby the movement of the choke valve will open the throttle valve, said throttle valve being capable of moving independent of the choke valve, and a pump actuated by the throttle valve for injecting fuel into said carbureting passage as the throttle valve is moved into open position.

7. In a carburetor having a carbureting passage, a throttle valve controlling the flow of combustible mixture from the passage, an emulsion tube having open ends disposed longitudinally within the passage, a nozzle discharging into said emulsion tube, and a frusto conical spreader disposed at the discharge end of said emulsion tube and diverging in the direction of air flow through the tube, said spreader having arms engaging said tube whereby the spreader is secured to the tube.

8. A down draft carburetor comprising, in combination, a body providing a carbureting passage and a float bowl, an emulsion tube disposed in said carbureting passage cast integral with said body, an upwardly inclined bore in said body terminating at its upper end in said emulsion tube and having communication with said float bowl, a shoulder formed by said bore, a tubular nozzle removably received in said bore and projecting into said emulsion tube, said nozzle having a downwardly directed discharge orifice in the end projecting into said emulsion tube and an annular flange at the other end, a screw plug for closing the lower end of the bore, and a spring interposed between said plug and said nozzle to retain the latter with the flange against said shoulder.

9. A carburetor comprising, in combination, a carbureting passage, a throttle valve controlling the flow of combustible mixture through said passage, an emulsion tube in said passage disposed longitudinally thereof and discharging longitudinally into said passage anterior to said throttle valve, a main fuel nozzle discharging into said emulsion tube, an idling fuel supply discharging into said carbureting passage posterior to said throttle valve, a float bowl, a fuel passage leading from said float bowl and communicating with said main nozzle and said idling fuel supply to furnish fuel thereto, said passage communicating with said float bowl through a fixed metering jet supplying a constant quantity of fuel and a variable and constantly open jet in parallel, means responsive to the vacuum in said carbureting passage controlling said variable jet to supply additional fuel during the power range of operation of the carburetor, and a metering jet diposed in said fuel passage anterior of the point of communication of said idling fuel supply and said nozzle with said fuel passage.

10. A carburetor comprising, in combination, a carbureting passage, a throttle valve controlling the flow of combustible mixture through said passage, a main fuel nozzle discharging into said passage anterior to said throttle valve, an idling fuel supply discharging into said passage posterior to said throttle valve when the same is in closed position, a float bowl, a fuel supply passage leading from said float bowl and communicating with said main nozzle and said idling supply to conduct fuel thereto, a first metering jet in said fuel passage determining the quantity of fuel normally supplied to said passage, a second variable metering jet operable to supply additional fuel to said fuel passage during the power range of operation of said carburetor, means controlling said second jet normally urged to open the jet, means responsive to the vacuum in said carbureting passage connected to said controlling means and operable to close said jet upon an increase in vacuum, and a third metering jet disposed in said fuel passage anterior of the point of communication of both said main nozzle and said idling supply with said fuel passage and posterior to said first jet to control the flow through the fuel passage during the power range of operation and when said first jet no longer limits the quantity of fuel.

11. A carburetor comprising, in combination, a carbureting passage, a throttle valve controlling the flow of combustible mixture through the passage, a main fuel nozzle discharging into said passage anterior to said throttle valve, an idling fuel supply discharging into said passage posterior to said throttle valve, a float bowl, a fuel supply passage leading from said float bowl and communicating near one end with said nozzle and said idling supply, a metering pin housing providing communication between said float bowl and said fuel passage threaded into one end of said passage, said housing having a metering pin jet formed therein, a metering pin incapable of completely closing said jet normally disposed in said jet to meter the quantity of fuel supplied to said fuel passage, means actuated by the vacuum in said carbureting passage tending to withdraw said pin from said jet upon a drop in vacuum, and a separate power jet disposed in said housing posterior to said metering pin jet to govern the quantity of fuel supplied when said metering pin is withdrawn.

12. A carburetor comprising, in combination, a carbureting passage, a throttle valve controlling the flow of combustible mixture through the passage, a main fuel nozzle discharging into said passage anterior to said throttle valve, an idling fuel supply discharging into said passage posterior to said throttle valve, a float bowl, a fuel supply passage communicating with said nozzle and said idling supply, a constant metering opening providing a communication between said float bowl and said fuel passage, a metering pin jet between said fuel passage and said float bowl in parallel with said constant opening, a metering pin smaller than said jet so as to be incapable of completely closing the same adapted to project into said jet, means responsive to the vacuum in said carbureting passage for controlling said pin to increase the flow through said jet upon a decrease in vacuum, and a power jet in said fuel passage anterior to the point of communication of said main nozzle and said idling supply controlling the fuel supplied during the power range of operation of the carburetor.

13. A carburetor comprising, in combination, a carbureting passage, a throttle valve controlling the flow of combustible mixture through the passage, an open ended emulsion tube disposed longitudinally of the passage and discharging longitudinally into said passage anterior to said throttle valve, a main fuel nozzle discharging into said emulsion tube, an idling fuel supply discharging into said passage posterior to said throttle valve, a float bowl, a fuel supply passage communicating with said nozzle and said idling supply, a constantly open metering pin jet providing communication between said float bowl and said fuel passage, a metering pin adapted to project into said jet, spring means for withdrawing the pin to open the jet, means responsive to the vacuum in said carbureting passage for controlling said metering pin moving the pin into the jet at high vacuum to reduce the jet opening and a separate power jet in said fuel passage controlling the fuel supplied to said nozzle during the power range of operation and while said metering pin is withdrawn.

JOHN RUSSELL EMERSON.